(12) United States Patent
Moser et al.

(10) Patent No.: US 8,914,770 B2
(45) Date of Patent: Dec. 16, 2014

(54) GENERATING COMPATIBLE PARTNER PROCESSES IN BPEL

(75) Inventors: Simon Moser, Tuebingen (DE); Marc Haebich, Nürnberg (DE); Axel Martens, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1790 days.

(21) Appl. No.: 11/549,105

(22) Filed: Oct. 12, 2006

(65) Prior Publication Data
US 2007/0174822 A1    Jul. 26, 2007

(30) Foreign Application Priority Data
Jan. 26, 2006    (EP) ..................................... 06100873

(51) Int. Cl.
*G06F 9/44*        (2006.01)
*G06Q 10/06*       (2012.01)

(52) U.S. Cl.
CPC *G06Q 10/06* (2013.01); *G06F 8/31* (2013.01); *G06F 8/35* (2013.01)
USPC ......................................... 717/107; 717/108

(58) Field of Classification Search
None
See application file for complete search history.

(56) References Cited

U.S. PATENT DOCUMENTS

| | | | | |
|---|---|---|---|---|
| 5,526,522 | A * | 6/1996 | Takeuchi ....................... | 717/107 |
| 6,701,381 | B2 * | 3/2004 | Hearne et al. .................. | 719/313 |
| 7,194,402 | B2 * | 3/2007 | Poplawski ........................ | 704/3 |
| 7,370,028 | B2 * | 5/2008 | Doughan ............................... | 1/1 |
| 7,380,237 | B2 * | 5/2008 | Goring et al. .................. | 717/115 |
| 2003/0023450 | A1 * | 1/2003 | Casati et al. ........................ | 705/1 |
| 2003/0115548 | A1 * | 6/2003 | Melgar ........................... | 715/513 |
| 2003/0229855 | A1 * | 12/2003 | Gorelov et al. ................ | 715/513 |
| 2004/0015928 | A1 * | 1/2004 | Seelemann ..................... | 717/156 |
| 2004/0250237 | A1 * | 12/2004 | Simonyi ......................... | 717/105 |
| 2005/0015732 | A1 * | 1/2005 | Vedula et al. .................. | 715/805 |

(Continued)

OTHER PUBLICATIONS

"The BPEL language", 2005, downloaded from http://www.radikalfx.com/bpel/language.html on Aug. 11, 2013.*

(Continued)

*Primary Examiner* — Jason Mitchell
(74) *Attorney, Agent, or Firm* — David A. Dagg

(57) ABSTRACT

The present invention relates to a Workflow Management System or a computer system with comparable functionality (WFMS). More particularly the invention relates to a method or means for generating a runtime compliant partner process for a given original process, wherein both processes are dedicated to interact with each other. In order to provide a method for generating a runtime compliant partner process for a given original process, which is easier understandable for a process developer, it is proposed to perform the steps of:

Step 1: Identifying all activities of the original process interacting with the partner process,
Step 2: Determining if an activity is able to be mirrored by a mechanism supported by the business process language, e.g. BPEL,
Step 2.1: If yes, generating the mirrored activity and creating a respective activity name,
Step 2.1: If not, using a predetermined mathematical method for dissecting such an activity that into a set of sub-activities, which can be mirrored,
Step 2.2.1: Generating a respective mirrored sub-activity and creating a respective activity name for each sub-activity,
Step 2.2.2: Arranging the mirrored sub-activities according to the outcome of the predetermined mathematical method.

10 Claims, 6 Drawing Sheets

(56) References Cited

U.S. PATENT DOCUMENTS

| | | | |
|---|---|---|---|
| 2006/0168115 A1* | 7/2006 | Loupia et al. | 709/218 |
| 2006/0190926 A1* | 8/2006 | Bennett et al. | 717/114 |
| 2006/0206599 A1* | 9/2006 | Milligan et al. | 709/223 |
| 2006/0259289 A1* | 11/2006 | Shia | 703/12 |
| 2007/0021995 A1* | 1/2007 | Toklu et al. | 705/7 |
| 2007/0033582 A1* | 2/2007 | Hu et al. | 717/156 |
| 2008/0022257 A1* | 1/2008 | Baartman et al. | 717/106 |

OTHER PUBLICATIONS

"The BPEL language", copyright 2005, as downloaded from <http://www.radikalfx.com/bpel/language.html> on Mar. 20, 2014.*

"Analyzing Web Service based Business Processes" Axel Martens, Proc. of Intl. Conf. on Fundamental Approaches to Software Engineering (2005), LNCS 3442, Springer-Verlag.

"Analysis and re-engineering of Web Services" Axel Martens, Proc. of 6th Intl. Conf. on Enterprise Information Systems (2004), Porto, Portugal.

* cited by examiner

GENERATING COMPATIBLE PARTNER PROCESSES IN BPEL

CROSS REFERENCE TO RELATED APPLICATIONS

The present application claims priority under 35 USC 119 to European Patent Application Number EP06100873.6, filed Jan. 26, 2006.

FIELD OF THE INVENTION

The present invention relates to a Workflow Management System (WFMS) or a computer system with comparable functionality. More particularly, the invention relates to a method or means for generating a runtime compliant partner process for a given original process, wherein both processes are dedicated to interact with each other.

BACKGROUND OF THE INVENTION

Workflow Management Systems (WFMS) support the development, execution and monitoring of business processes. A business process specifies a set of work items and their dependencies along with required resources and assigned roles. Within a WFMS environment, the execution of work items is triggered and monitored by the workflow engine, and even performed automatically for some work items—whereas the individual pieces of work might be distributed across a multitude of different computer systems connected by some type of network.

IBM® WebSphere® Business Process Choreographer represents such a typical modern, sophisticated, and powerful workflow management system. It supports the definition of business processes as a process graph via a graphical editor, while using an underlying flow definition language, such as Business Process Execution Language for Web Services (BPEL4WS). In this language, the actual work items are externalized as Web Services, accessible via standardized interfaces that are specified by help of the Web Services Definition Language (WSDL).

Since 2002, the Business Process Execution Language for Web Services (BPEL4WS) is in the very act of becoming the industrial standard for describing distributed business processes. On the one hand, a BPEL business process is a Web service. On the other hand, a BPEL business process interacts with one or more other Web services, which again can be business processes. Such a Web service is called partner of the BPEL process. Each Web service plays a role in a distributed business transaction, i.e. Buyer and Seller, or Producer and Supplier. Given a BPEL business process, in many cases it is useful to generate a 'blueprint' process for the other side, which has assured properties like i.e. behavioral compatibility.

The general challenge is to guarantee behavioral compatibility [c.f. Axel Martens: Analyzing Web Service based Business Processes. In: Proc. of Intl. Conf. on Fundamental Approaches to Software Engineering (FASE'05), LNCS 3442, Springer-Verlag] between two interacting processes in an early design period, particularly in situations in which the original process exists already, and the partner process is in a development phase. To illustrate the underlying problem of behavioral compatibility, FIG. 1 depicts a situation wherein two BPEL processes do not work together well although the interfaces between both processes are perfectly compatible.

In more detail, in FIG. 1, the original BPEL process 200 at the right side interacts with a partner process 100 on the left side. The original BPEL process defines a sequence 205 of three activities: receiving the login data 210, making an internal decision 215, and returning the delivery data. The decision distinguishes two cases 220, 225. Each case implements the parallel execution (i.e. 230) of two sequences (i.e. 240, 255), in which also interaction happens. The interaction to the partner is realized via two interfaces 90, 95, which together form a partner link.

The partner process 100 shown on the left side just mirrors the structure of the original BPEL process. After sending the login data 110, the partner makes a decision 115 on its own to act like a premium customer 120 or like a regular customer 125. While his decision is not synchronized with the decision of the original BPEL process, it is crucial to the interaction. Let's assume the partner 100 acts like a premium customer: He sends terms of payment and order, and awaits discount information 150 and confirmation 165. The original BPEL process, however, might treat him like a regular customer 225 because he might have lost his status because it was too long since he last ordered. In that case 235, it acknowledges the order 290 with the standard business conditions (SBC) 295 and awaits the payment 275. Now, both of the processes are waiting and none can continue on its own—a classical deadlock situation. In the result, the behavior of both BPEL processes is not compatible.

Generating a behaviorally compatible partner process is a non-trivial task. A straight-forward approach could possibly be seen in a structural, pure BPEL-based method. The main idea is to analyze the original process' structure and to reflect it. In the end, this yields a so-called "mirrored" partner process, like the one shown in FIG. 1. While this approach would be based on static mapping rules of all BPEL activities, it does not always generate a compatible partner process as the initial example of FIG. 1 has proven.

A second approach is referred to as "communicational" method and is based on a formal, mathematical analysis of the process model. Some details are given in FIG. 2 which shows a block diagram representation of the basic steps of the latter-mentioned prior art partner process generation method. Such prior art method is published at [Axel Martens: Analysis and re-engineering of Web Services. In: Proc. of 6th Intl. Conf. on Enterprise Information Systems (ICEIS'04), Porto, Portugal].

In step A the original process 200 is transformed into a formal input representation 320 as for example Petri Nets, or π-Calculus. This representation is intermediary in nature. It describes formally the internal logic of the original process, and its externally visible communication behavior.

In step B2 the communication behavior of the formal input representation 320 is analyzed. This yields the communication graph that contains all possible sequences of input and output messages that may occur in the given process—the communication model 330 of the given BPEL process. Because some of those possible communication sequences might yield unwanted situations (like deadlocks, c.f. FIG. 1), the partner to generate should avoid those unsound sequences.

In step C the communication graph is restricted and projected to usable behavior. This yields to a sub-graph that represents a controller model 340 for the given BPEL process. Finally, in step D, the controller model, which is a graph, has to be transformed into a process model. The prior art method does perform a generation of a formal process model representation 345, but it does not bridge the gap to the target language BPEL.

On the level of formal process model representations, the communicational method can be proven to produce behaviorally compatible processes—in contrast to the previously mentioned structural method. However, it will consider actually all possible sequences of communication activities. To illustrate that drawback: For a number of 12 communication activities in the original process, there are 12!=47,900,1600 possibilities to order them. The complexity to order the activities of two parallel sequences of the length 8 has an order of 48=65,536. Hence, the method often will yield a partner process that is often too complex to be easily understood by the partner, making it rather hard to refine it, since the process logic might be "distributed" in the generated partner process. This can be assumed to be caused by the mathematical algorithm used within the method. Thus, this prior art method has significant disadvantages for the developer and is not widely accepted, when developing a partner process.

It is thus an objective of the present invention to provide a method for generating a runtime compliant partner process for a given original process, which is easier understandable for a process developer.

SUMMARY OF THE INVENTION

The objectives of the invention are achieved by the features stated in enclosed independent claims. Further advantageous arrangements and embodiments of the invention are set forth in the respective sub-claims. Reference should now be made to the appended claims.

According to the most basic aspect of the present invention a method is disclosed for generating a runtime compliant partner process for a given original process, wherein both processes are dedicated to interact with each other, including the steps of:

1. Identifying all activities of the original process, interacting with the partner process, and characterized by the steps of:
2. Determining if an activity is able to be mirrored by a mechanism supported by the business process language, e.g. BPEL,
   2.1 If yes, generating the mirrored activity and creating a respective activity name,
   2.2 If not, using a predetermined mathematical method for dissecting such an activity into a set of sub-activities that can be mirrored, followed by
       2.2.1 Generating a respective mirrored sub-activity and creating a respective activity name for each sub-activity, and followed by
       2.2.2 Arranging the mirrored sub-activities according to the outcome of the predetermined mathematical method.

Thus, a hybrid approach made from two distinct solutions is disclosed which takes profit of the advantages of both methods, and which avoids the disadvantages thereof. The basic advantage is that a behaviorally compatible partner process is found automatically. Further, the probability is high that the partner process has the same or nearly the same degree of complexity as the underlying original process. Of course, this will often depend of the actual case in question.

The key idea of this invention is thus to generate a partner process with the help of the two different approaches mentioned above applying them in a specific, combined way: The structural, BPEL-based operation mode mentioned above and the communicational (or analytical) operation mode.

The resulting partner process contains the necessary process logic for a compatible behavior respect to the original process, while it has a significantly reduced number of activities. In contrast to a pure communicational approach, the disclosed hybrid approach mirrors most of the structure of the original process and therefore makes it understandable, readable and able to be manipulated. But, compared with a pure BPEL approach, the generated partner process is guaranteed to be behaviorally compatible to the original process. By that any workflow can be mirrored with a reasonable extent of computational work.

Further, advantageously, BPEL is used as business process language. When further the determination step for the BPEL-specific activities Invoke, Pick, Flow and Sequence is run through directly by mirroring said activities into respective mirrored activities without using said mathematical method, then the disclosed method can be run with further reduced elapsed time.

Further advantageously, the process workflow is expressed by a hierarchical, tree-like structure, and the capability of a markup language, as for example XML, is used to map this tree-like structures into a specific format of the markup language. This helps to find an easy-to-do implementation for the basic disclosed method structure including the decision if or if not the mathematical method should be used. Thus, the mirroring procedure is further simplified.

When further reducing the number of potential combinations of sub-activities comprised of said set by applying some knowledge of the structure of the original process, then the additional advantage is achieved that the resulting partner process is as simple as possible.

When using a mapping vocabulary for mapping the names of an activity of the original process to names of a respective mirrored activity of the partner process, then an easy-to-do implementation is found for implementing an automatic name selection for the activities and sub-activities of the partner process.

As a person skilled in the art may appreciate, the original process and the generated partner process are never deadlocking. This is achieved through switching back and forth between those two operation modes, based on certain heuristics.

The method disclosed herein solves the above-mentioned problem by generating a guaranteed behaviorally compatible and therefore runtime compliant partner process that is simple enough to be understood.

A business partner implementing the partner process can advantageously use this 'blueprint' process generated according to the present invention and may refine it, based on certain rules, towards his special needs.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 2:
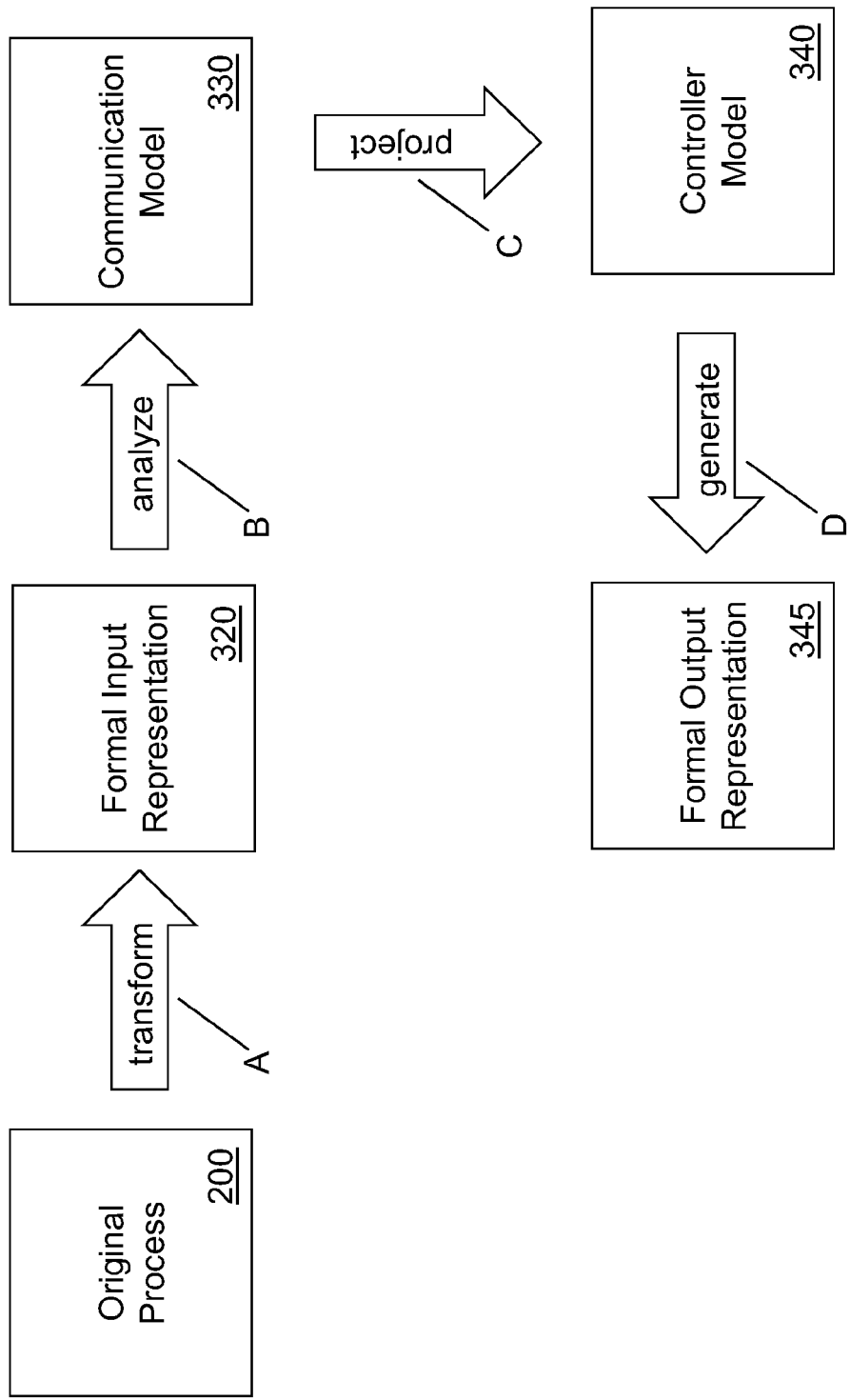
FIG. 2 is a schematic block diagram representation of the basic steps of a prior art partner process generation method.
Figure 3:
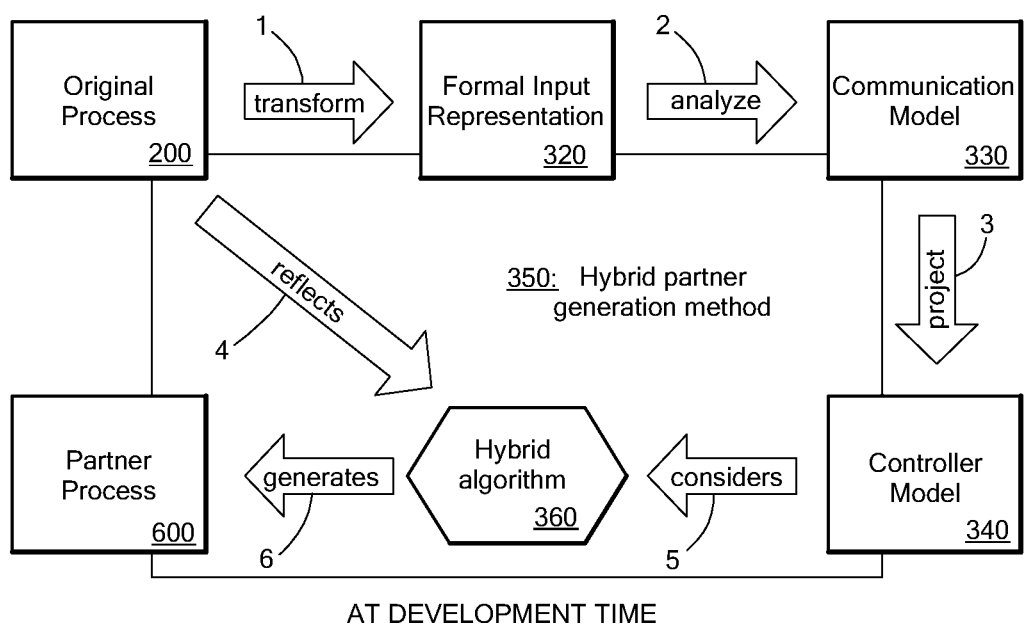
FIG. 3 is a schematic block diagram representation of the basic steps of the disclosed hybrid partner process generation method, according to a preferred embodiment.

With general reference to FIGS. 3 to 6, a rough overview is given how a preferred embodiment of the disclosed method is preferably performed. As shown in FIG. 3, the following steps are performed at development time of the partner process:

Steps 1 to 3 coincide with steps 1 to 3 as described for prior art above (c.f. FIG. 2). In step 4, the structure of the original input process is parsed into a process structure tree, where complex structured activities (like sequence, flow, etc.) form intermediate nodes, and basic activities (like receive, reply, etc.) form the leaf nodes of that tree.

Concurrently, in step 5 the available information about sound communication sequences contained in the controller model 340 is fed into the disclosed hybrid algorithm 360. By mirroring the parsed structure of the original process 200 as far as possible and by treating structures that can't be mirrored with regard to the controller model 340, the hybrid algorithm 360 generates in step 6 the desired partner process model 600, which is behaviorally compatible to the original process and as small in size and complexity as possible.

Figure 4:
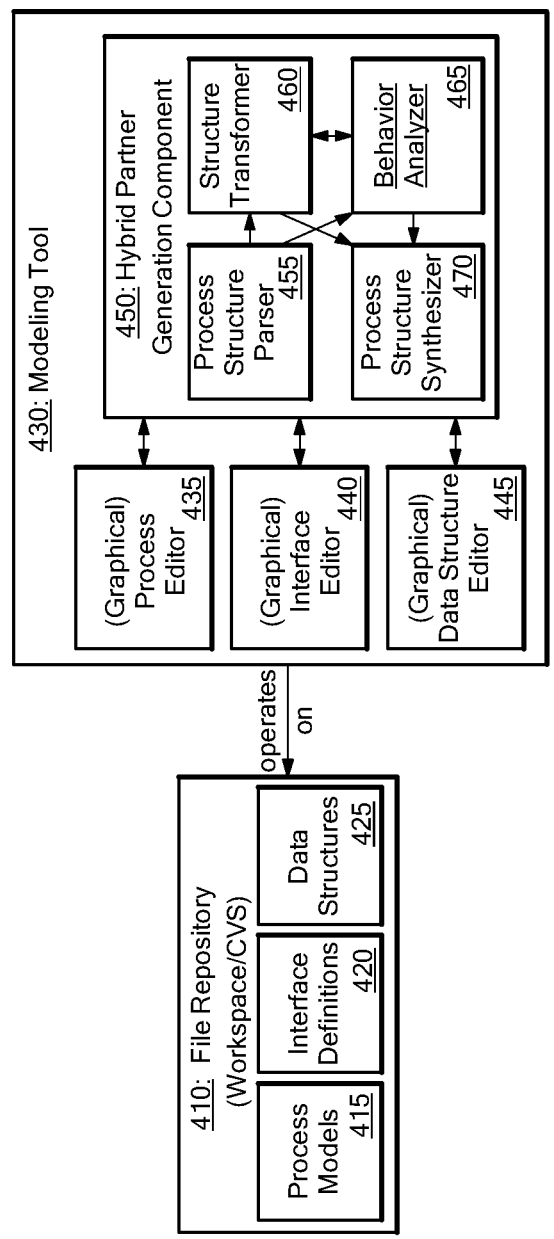
FIG. 4 is a schematic block diagram representation of the basic functional elements of the disclosed hybrid partner process generation system, and its integration into existing development environments.

FIG. 4 depicts the integration of the disclosed hybrid partner generation method 450 into a given modeling tool development environment 430. As shown in FIG. 4, the development environment 430 includes a process editor 435, interface editor 440 and data structure editor 445. The development environment 430 further includes the hybrid partner generation method 450, which includes functional components 455, 460, 465 and 470. Further shown in FIG. 4 is a file repository 410, including process models 415, interface definitions 420, and data structures 425. Steps 1 and 4 are performed by the functional component 455, which walks through the original process model 415 and collects and/or transforms the relevant information. The formal, mathematical analysis is realized by the functional component 465, which applies model-checking-like technologies to distinguish sound and unsound communication sequences. This component 465 is widely independent from the actual chosen process modeling language (e.g. BPEL). The structural mirroring of individual activities with regard to the means of the chosen process modeling language is performed by the functional component 460. Finally, functional component 470 represents the core of the disclosed hybrid approach by combining the results of structural transformation 460 and behavioral analysis 465. It generates automatically the partner process model for the given original process. The behavioral compatibility between the original process and the resulting partner process is guaranteed per construction, which can even be proved mathematically.

Figure 1:
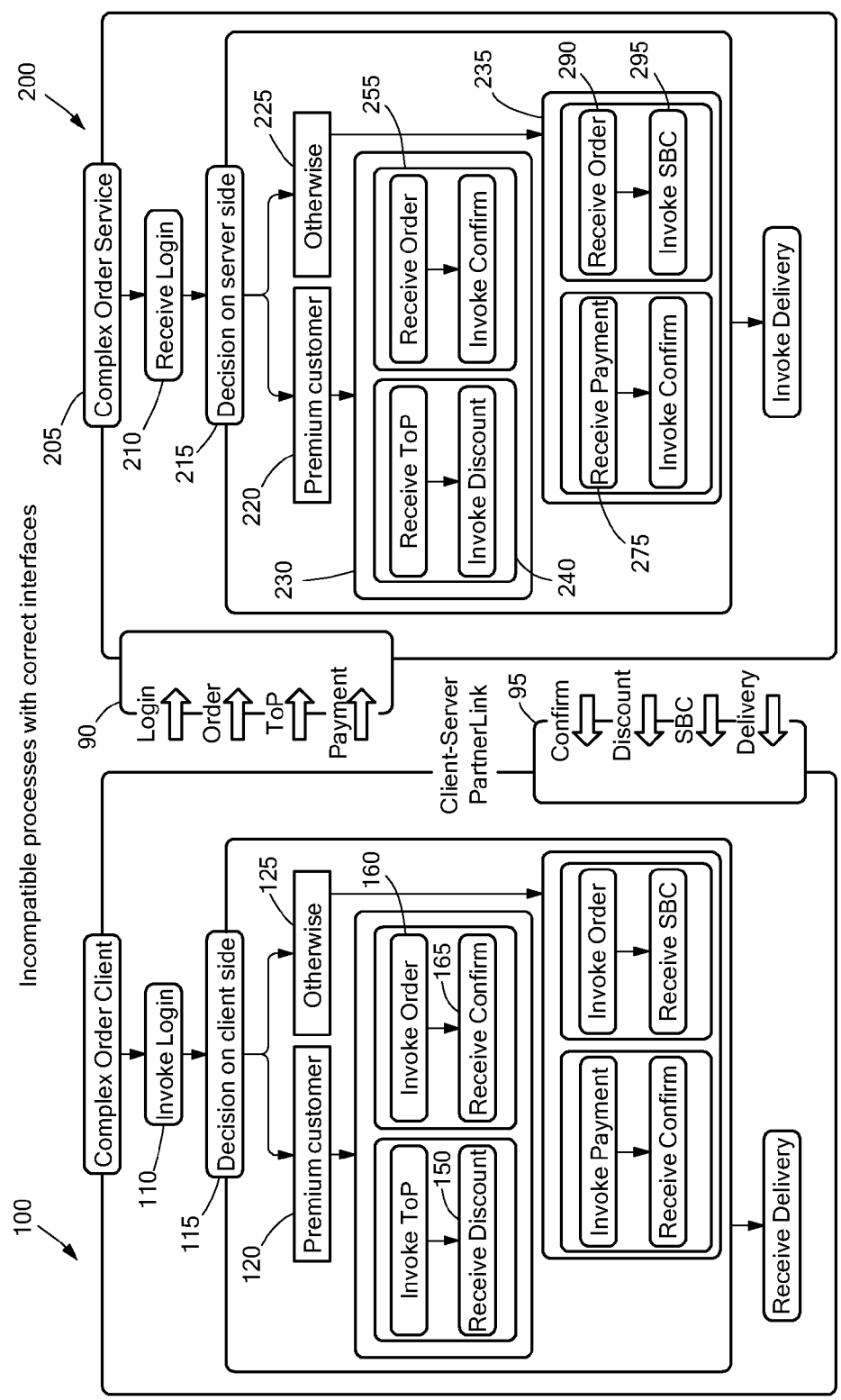
FIG. 1 is a schematic process diagram representation of a sample business process interaction—expressly held simple—between the original process (right) and a "mirrored" partner process (left), showing behavioral incompatibilities, when implemented according to prior art.
Figure 5:
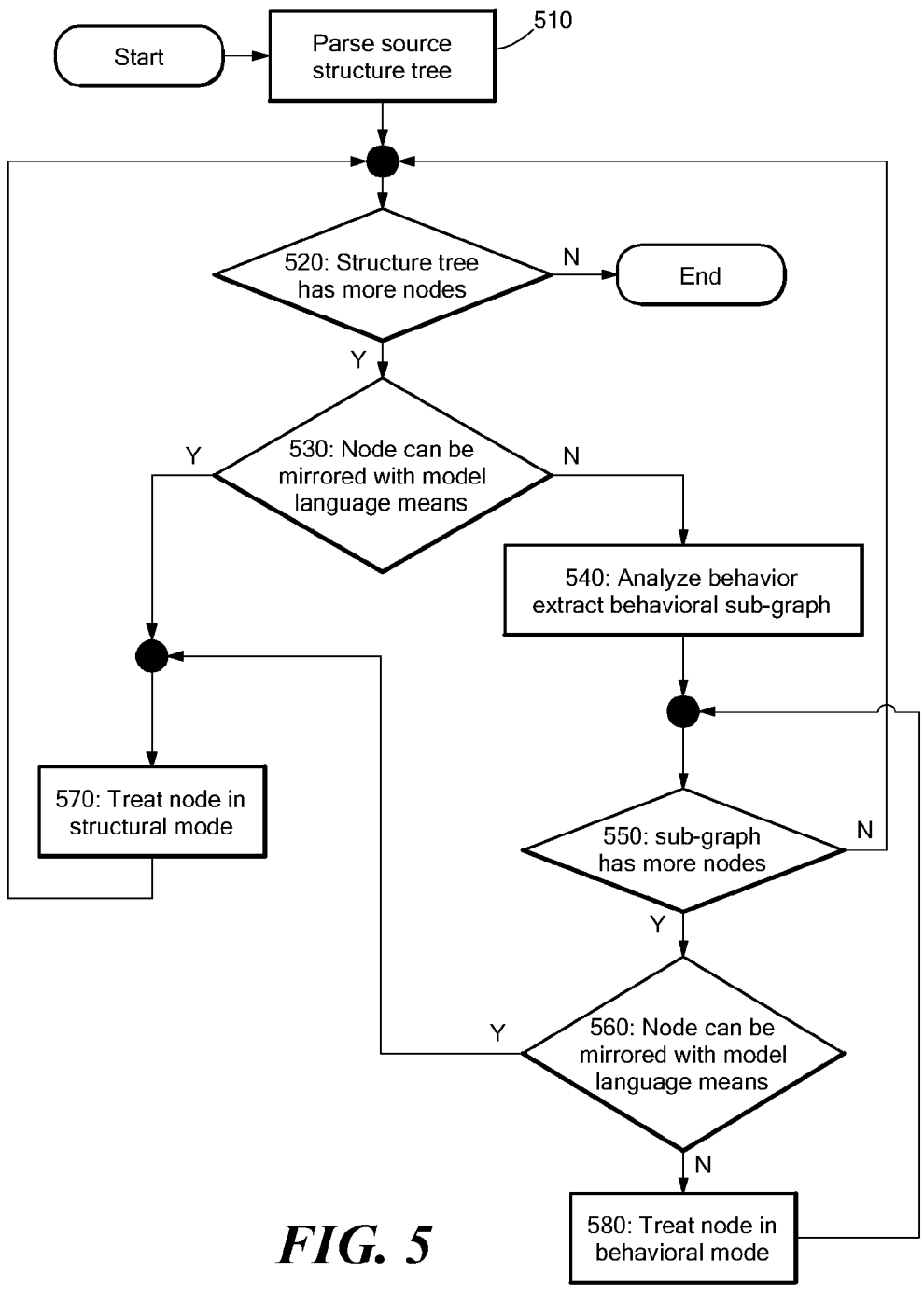
FIG. 5 is a schematic flow diagram representation of the algorithmic steps of the disclosed hybrid partner generation method, and their dependencies/correlations.
Figure 6:
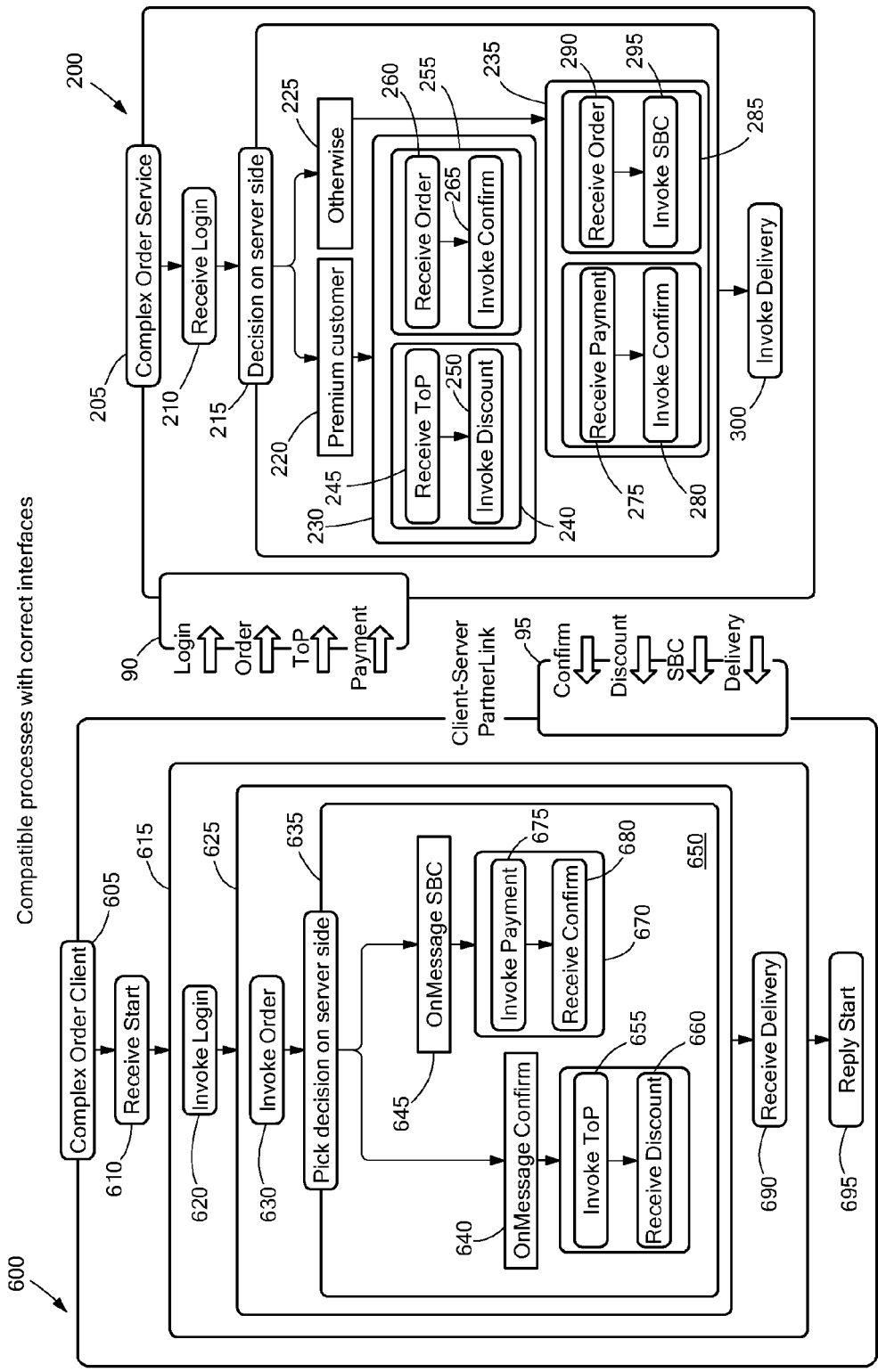
FIG. 6 is a schematic process diagram representation of the business process interaction between the original process and a partner process that was generated by the disclosed method.

Next, the disclosed hybrid algorithm 360 will be explained in greater detail. To do so, the individual algorithmic steps that are shown in FIG. 5 will be described in general as well as applied to the introducing example of the order service (c.f. FIG. 1). The result of the hybrid partner generation—i.e. the generated partner of the order service—is shown in FIG. 6, on the left side. The original order process is replicated on the right side of FIG. 6.

The invention exploits the fact that most of processes workflows are expressible also by a hierarchical tree-like structure. Thus, the invention uses the capability of XML and comparable languages to map such tree structures into a language-specific format. As shown in FIG. 5, the disclosed method parses the process model into a structure tree 510 where complex structured activities (like sequence, flow, etc.) form intermediate nodes, and basic activities (like receive, reply, etc.) form the leaf nodes of that tree. For each node in that structure tree—which is enforced by the initial decision 520—the classification is made in a decision 530 whether it can either be mirrored with simple modeling language means, or it has to be decomposed into sub-structures.

In the first case, which is preferably entered, the current node is treated in structural (BPEL) mode 570. That means, by looking at the mapping rule catalogue, which will be explained later, a corresponding mirrored BPEL activity with a respective activity name is generated, and it is inserted into the result structure tree. Then, the next node is treated by looping back to the initial decision 520. This cycle is called "Structural Cycle".

In case no mirrored activity can be found (NO branch of 530), the behavior of the current activity is analyzed (540), which yields a behavioral sub-graph comprising a sub-tree of activities. In other words, an activity which can't be mirrored by structural (BPEL) means is processed by zooming into it and dissecting the activity into a plurality of connected sub-activities.

Similar to the structural cycle, for each node of that sub-graph 550 the classification is made in a decision 560 whether it can either be mirrored with simple modeling language means, or it has to be decomposed into sub-structures. In the first case, the current activity is handed over to the structural treatment 570. Otherwise, the activity is treated in the behavioral mode 580 according to the mathematical model (like the before-mentioned Petri net model). Then, the control flow loops back to the next activity of the sub-graph 550. This cycle is called "Behavioral Cycle". When the sub-graph has been processed completely (decision 550 yields NO), the control flow loops back to the initial decision 520 in order to continue with the next "ordinary" node.

Next, the mapping rule catalogue is described in more detail:

A BPEL activity is mirrored by mapping it to its counterpart elements in the partner. This is done according to a pre-defined catalogue of mapping rules, of which some are disclosed as follows:

Asynchronous "Invoke" is mapped to "Receive" (without Reply).

Synchronous "Invoke" is mapped to "Receive" and "Reply".

"Pick" is mapped to "Switch" while for each "onMessage" branch in the pick activity there will be one "Case" branch in the switch activity that invokes the corresponding message. As the initial example (FIG. 1) has shown, the mapping of "Switch", i.e. an internal decision within the original partner, needs treatment in the behavioral mode.

"Sequence" and "Flow" are mapped to "Flow" to allow maximal freedom of connecting the embedded activities. In case of sequential behavior within the generated partner process, some flow activities might be replaced by sequences to simplify the structure. This does not have any impact on the correctness of the generation. It is rather a question of optimizing the generation's output.

Whenever a pattern occurs that can't be transformed by simply mirroring it (e.g. switch, while), the disclosed method switches from its structural operation mode into the behavioral mode. In the behavioral mode, the disclosed method extracts the information about the behavior of the current pattern from the communication graph. Then, it generates receive, reply, or invoke activities for all messages that occur in the relevant sub-graph. Finally, the disclosed method connects those generated activities by control flow links and/or embeds them into structured activities in order to realize the desired behavior. In general, "Switch" is transformed to "Pick" or a cascade of pick activities, and "While" is transformed again to "While".

In the behavioral mode, the approach reacts to the appearance of patterns that permit to switch back to the structural mode. As patterns requiring the two different modes may be contained alternating in the structure tree, it is possible that the disclosed hybrid approach switches the operation mode forward and backward several times during the generation of a runtime compliant partner process.

EXAMPLE

FIG. 6 illustrates the disclosed method. The left side shows the partner process 600 generated by aid of the disclosed method. It should be noted that the right side shows the original process 200, which remains unchanged in relation to FIG. 1, nor is changed by the disclosed method.

Because each BPEL process needs to be initialized by an incoming message, the disclosed approach distinguishes three cases: Either the given process initiates the partner to generate, or both processes are initiated independently by an external component, or the original process is initiated by the partner to generate. FIG. 6 depicts the last case. Consequently, the partner process itself has to be generated from outside. Hence, two activities 610, 695 realize the communication with that third, not shown party.

The first activity of the original process 200 is a sequence 205 of three activities 210, 215, and 300. As mentioned before, a sequence is mapped into a flow 615 in the structural operation mode. Moreover, its first (210) and last (300) activity can be treated in the structural operation mode as well. This yields corresponding, mirrored activities (210=>620, 300=>690).

In contrast, the internal decision of the original process 215 cannot be mirrored directly. Hence, the disclosed hybrid method switches to behavioral mode and extracts the information about that decision from the communication graph (c.f. Step 5 in FIG. 3). It turns out by analyzing the activities of the original process that to utilize the original process correctly, the order is required in both cases 260, 290. If the original process has chosen the premium customer branch 220, it will return a confirmation 265. Otherwise, it will send the standard business conditions (SBC), 295. This information is mapped into the partner 600 as follows:

A flow activity 625 is generated in correspondence to the switch 215. First the order is sent (630) and then the pick activity (635) distinguishes those two "onMessage" branches 640, 645. Finally, the body of each "onMessage" branch is generated in structural mode again. Branch 640 is shown including invoke ToP activity 655 and Receive Discount activity 660, and branch 645 is shown including Invoke Payment activity 675 and Receive Confirm activity 680.

As mentioned before, mapping a sequence into a flow activity allows maximal freedom of connecting the embedded activities. Nevertheless, additional steps of simplification, which are also part of this disclosure, might re-transform flow activities into sequences. If such additional steps of simplification were applied to the example shown in FIG. 6, two flow activities would be changed to sequences 650, 670, and two flow activities 615, 625 would be unnecessary, because their child activities are moved into the surrounding sequence activity 605.

The present invention can be realized in hardware, software, or a combination of hardware and software. A partner process generating tool according to the present invention can be realized in a centralized fashion (i.e. in one computer system) or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method, embodied in at least one computer, for generating a separate runtime compliant partner process for a given original process, wherein both processes are dedicated to interact with each other, the computer performing the steps comprising:
    identifying all activities of the original process interacting with said separate partner process;
    determining, at least in part according to a pre-defined catalogue of mapping rules, whether an activity in said original process is able to be mirrored in said separate partner process, wherein said activity in said original process is able to be mirrored in said separate partner process in the event that a mirrored activity corresponding to said activity in said original process can be found in said catalogue of mapping rules, wherein said determining further includes determining whether said activity in said original process comprises a BPEL switch activity, and determining that said activity in said original process is not able to be mirrored in said partner process responsive to a determination that said activity in said original process comprises a BPEL switch activity;
    responsive to a determination that said activity in said original process is able to be mirrored in said separate partner process, generating said mirrored activity corresponding to said activity in said original process and inserting said mirrored activity corresponding to said activity in said original process into a result structure tree; and
    responsive to a determination that said activity in said original process is not able to be mirrored in said separate partner process, dissecting said activity in said original process into sub-activities which can be mirrored in said separate partner process and generating a respective mirrored sub-activity for each of said sub-activities, inserting said mirrored sub-activities into said result structure tree, and, in the case where said activity in said original process comprises a BPEL switch activity, transforming said BPEL switch activity into a cascade of BPEL pick activities in said result structure tree to connect said mirrored sub-activities.

2. The method according to claim 1, wherein a process workflow is expressed by a hierarchical tree-like structure, and the capability of a markup language is used to map said tree-like structures into a specific format of said markup language.

3. The method according to claim 1, further comprising the step of using a mapping vocabulary for mapping a name of said activity of said original process to a name of said mirrored activity.

4. The method of claim 1, further comprising:
    wherein said generating said mirrored activity corresponding to said activity in said original process and inserting said mirrored activity corresponding to said activity in said original process into a result structure tree responsive to said determination that said activity in said original process is able to be mirrored in said separate partner process comprises a structural cycle; and
    wherein said dissecting said activity in said original process into sub-activities which can be mirrored in said separate partner process responsive to said determination that said activity in said original process is not able to be mirrored in said separate partner process comprises a behavioral cycle.

5. A system including at least one processor and a non-transitory computer readable memory, said non-transitory computer readable medium having program code stored thereon for, when executed on said processor, generating a separate runtime compliant partner process for a given original process, wherein both processes are dedicated to interact with each other, said program code comprising:
    program code for identifying all activities of the original process interacting with the separate partner process;
    program code for determining, at least in part according to a pre-defined catalogue of mapping rules, whether an activity in said original process is able to be mirrored in said separate partner process, wherein said activity in said original process is able to be mirrored in said separate partner process in the event that a mirrored activity corresponding to said activity in said original process can be found in said catalogue of mapping rules, wherein said determining further includes determining whether said activity in said original process comprises a BPEL switch activity, and determining that said activity in said original process is not able to be mirrored in said partner process responsive to a determination that said activity in said original process comprises a BPEL switch activity;
    program code for, responsive to a determination that said activity in said original process is able to be mirrored, generating said mirrored activity corresponding to said activity in said original process and inserting said mirrored activity corresponding to said activity in said original process into a result structure tree; and
    program code for, responsive to a determination that said activity in said original process is not able to be mirrored in said separate partner process, dissecting said activity in said original process into sub-activities which can be mirrored in said separate partner process and generating a respective mirrored sub-activity for each of said sub-activities, inserting said mirrored sub-activities into said result structure tree, and, in the case where said activity in said original process comprises a BPEL switch activity, transforming said BPEL switch activity into a cascade of BPEL pick activities in said result structure tree to connect said mirrored sub-activities.

6. The system according to claim 5, wherein a process workflow is expressed by a hierarchical tree-like structure, and the capability of a markup language is used to map said tree-like structures into a specific format of said markup language.

7. The system of claim 5, further comprising:
    wherein said program code for generating said mirrored activity corresponding to said activity in said original process and inserting said mirrored activity corresponding to said activity in said original process into a result structure tree responsive to said determination that said activity in said original process is able to be mirrored in said separate partner process comprises program code for performing at least one structural cycle; and
    wherein said program code for dissecting said activity in said original process into sub-activities which can be mirrored in said separate partner process responsive to said determination that said activity in said original process is not able to be mirrored in said separate partner process comprises program code for performing at least one behavioral cycle.

8. A computer program product including a non-transitory computer readable medium, said computer readable medium having program code stored thereon for generating a separate runtime compliant partner process for a given original process, wherein both processes are dedicated to interact with each other, said program code comprising:

program code for identifying all activities of the original process interacting with the separate partner process;

program code for determining, at least in part according to a pre-defined catalogue of mapping rules, whether an activity in said original process is able to be mirrored in said separate partner process, wherein said activity in said original process is able to be mirrored in said separate partner process in the event that a mirrored activity corresponding to said activity in said original process can be found in said catalogue of mapping rules, wherein said determining further includes determining whether said activity in said original process comprises a BPEL switch activity, and determining that said activity in said original process is not able to be mirrored in said partner process responsive to a determination that said activity in said original process comprises a BPEL switch activity;

program code for, responsive to a determination that said activity in said original process is able to be mirrored in said separate partner process, generating said mirrored activity corresponding to said activity in said original process and inserting said mirrored activity corresponding to said activity in said original process into a result structure tree; and program code for, responsive to a determination that said activity in said original process is not able to be mirrored in said separate partner process, dissecting said activity in said original process into sub-activities which can be mirrored in said separate partner process and generating a respective mirrored sub-activity for each of said set of sub-activities, inserting said mirrored sub-activities into said result structure tree, and, in the case where said activity in said original process comprises a BPEL switch activity, transforming said BPEL switch activity into a cascade of BPEL pick activities in said result structure tree to connect said mirrored sub-activities.

9. The computer program product according to claim 8, wherein a process workflow is expressed by a hierarchical tree-like structure, and the capability of a markup language is used to map said tree-like structures into a specific format of said markup language.

10. The computer program product of claim 8, further comprising:

wherein said program code for generating said mirrored activity corresponding to said activity in said original process and inserting said mirrored activity corresponding to said activity in said original process into a result structure tree responsive to said determination that said activity in said original process is able to be mirrored in said separate partner process comprises program code for performing at least one structural cycle; and wherein said program code for dissecting said activity in said original process into sub-activities which can be mirrored in said separate partner process responsive to said determination that said activity in said original process is not able to be mirrored in said separate partner process comprises program code for performing at least one behavioral cycle.

* * * * *